United States Patent
Szowa et al.

(10) Patent No.: US 9,251,149 B2
(45) Date of Patent: Feb. 2, 2016

(54) DATA SET SIZE TRACKING AND MANAGEMENT

(75) Inventors: Marek Szowa, Cedar Park, TX (US); Kerry Zack, Laurel, MD (US)

(73) Assignee: BMC SOFTWARE, INC., Houston, TX (US)

( * ) Notice: Subject to any disclaimer, the term of this patent is extended or adjusted under 35 U.S.C. 154(b) by 1048 days.

(21) Appl. No.: 12/485,632

(22) Filed: Jun. 16, 2009

(65) Prior Publication Data

US 2010/0199058 A1 Aug. 5, 2010

Related U.S. Application Data

(60) Provisional application No. 61/149,570, filed on Feb. 3, 2009.

(51) Int. Cl.
| | | |
|---|---|---|
| G06F 12/00 | (2006.01) | |
| G06F 13/00 | (2006.01) | |
| G06F 13/28 | (2006.01) | |
| G06F 17/30 | (2006.01) | |

(52) U.S. Cl.
CPC .............................. *G06F 17/30067* (2013.01)

(58) Field of Classification Search
CPC .................................................. G06F 17/30067
USPC .......................................... 711/171, E12.001
See application file for complete search history.

(56) References Cited

U.S. PATENT DOCUMENTS

| | | | | | |
|---|---|---|---|---|---|
| 4,104,718 | A | * | 8/1978 | Poublan et al. | |
| 5,606,689 | A | * | 2/1997 | Nakagawa | |
| 5,790,852 | A | * | 8/1998 | Salm | 718/104 |
| 5,832,522 | A | * | 11/1998 | Blickenstaff et al. | |
| 5,909,540 | A | * | 6/1999 | Carter et al. | 714/4.4 |
| 5,987,230 | A | * | 11/1999 | Shimizu | 358/1.16 |
| 6,120,553 | A | * | 9/2000 | Sidwell | 717/151 |
| 6,807,664 | B1 | * | 10/2004 | Ohi | 717/164 |
| 7,472,242 | B1 | * | 12/2008 | Deshmukh et al. | 711/162 |
| 7,904,689 | B1 | * | 3/2011 | Carothers | 711/170 |
| 8,775,368 | B1 | * | 7/2014 | Burke et al. | 707/609 |
| 2003/0126393 | A1 | * | 7/2003 | Tanaka | 711/170 |
| 2005/0033775 | A1 | * | 2/2005 | Chen et al. | 707/200 |
| 2005/0235288 | A1 | * | 10/2005 | Yamakabe et al. | 718/100 |
| 2006/0080350 | A1 | * | 4/2006 | Mark | 707/102 |
| 2006/0195649 | A1 | * | 8/2006 | Bayt | 711/100 |
| 2007/0180087 | A1 | * | 8/2007 | Mizote et al. | 709/223 |
| 2008/0098086 | A1 | * | 4/2008 | Hara et al. | 709/217 |
| 2009/0031100 | A1 | * | 1/2009 | Hansen | 711/171 |
| 2010/0057985 | A1 | * | 3/2010 | Kaneda et al. | 711/114 |
| 2010/0077158 | A1 | * | 3/2010 | Asano et al. | 711/154 |
| 2010/0198795 | A1 | * | 8/2010 | Chen et al. | 707/674 |

* cited by examiner

*Primary Examiner* — Sheng-Jen Tsai

(57) ABSTRACT

Specified data sets may be tracked from creation to end-of-life (e.g., deletion). Between creation and end-of-life, data set storage changes may be recorded (i.e., when additional storage is allocated or when some storage is released). During a subsequent allocation cycle, this information may be used in conjunction with user-specified allocation rules to manage or control the data set's initial allocation.

20 Claims, 4 Drawing Sheets

DATA SET SIZE TRACKING AND MANAGEMENT

This application claims priority to U.S. Provisional application 61/149,570 entitled "A Method to Improve Disk Allocation with Data Set Size Assist," filed 3 Feb. 2009 and which is hereby incorporated by reference.

BACKGROUND

The invention relates generally to storage management for computer systems. More particularly the invention relates to tracking the extent to which data sets are enlarged and/or reduced in size over their lifetime and using this information to assist in making decisions when allocating the same data set in a subsequent instantiation. As will be recognized by those of ordinary skill in the art, data sets are the means by which an operating system manages storage. By way of example, in the z/OS operating system the term data set refers to a file that contains one or more records so that a data set may be thought of as any named group of records. Accordingly, as used herein the term "data set" refers to any aggregate collection of storage allocated and/or managed by an operating system.

One of the greatest abusers of direct access storage device (DASD) space is the data set that is consistently over allocated, where space may or may not be released at data set close. With products such as MAINVIEW® Storage Resource Manager StopX37/II by BMC Software, the assumption is generally made that most data sets are underallocated and storage is added as needed. (MAINVIEW is a registered trademark of BMC Software, Inc.) While this may be correct in theory, it is often not the case in practice. If a user is testing a new application, they will often use Job Control Language (JCL) that is intended for production work. Since tests generally use a smaller subset of data than does the production application, the allocations from the production JCL will often be too large. Thus, the data sets allocated may be substantially larger than they need to be. The excess storage wastes space on DASD.

Thus, it would be beneficial to provide a means to track the amount of storage used by a data set during the course of its life-time and, during a subsequent instantiation, allocate its storage based on this prior observed behavior.

SUMMARY

In one embodiment the invention provides a method to manage data set allocation actions. The method includes receiving a request to allocate storage for a data set, obtaining storage information for a prior allocation of the data set (e.g., from a database), obtaining at least one storage allocation rule applicable to the data set (determined, for example, by evaluation of one or more user-specified conditions) and altering the allocation request based on the obtained storage information and the at least one applicable allocation rule. The altered allocation request may then be used to obtain the data set, after which information reflecting the storage actually allocated to the data set may be recorded. A computer executable program to implement the method may be tangibly stored in a program storage device. The computer program so stored may be used to program a computer system to perform the described method.

DETAILED DESCRIPTION

In general, the invention relates to storage management operations for a computer system. More particularly, the invention relates to tracking specified data sets from their creation to end-of-life, recording to what degree the storage for these data sets were enlarged and/or reduced during their life-time and using this information in making storage allocation decisions when allocating the same data set in a subsequent instantiation.

The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will of course be appreciated that in the development of any such actual implementation (as in any software development project), numerous programming decisions must be made to achieve the developers' specific goals (e.g., compliance with system- and business-related constraints), and that these goals will vary from one implementation to another. It will be appreciated that such development effort might be complex and time-consuming, but would nevertheless be a routine undertaking of storage resource management program development for those of ordinary skill having the benefit of this disclosure.

Figure 1:
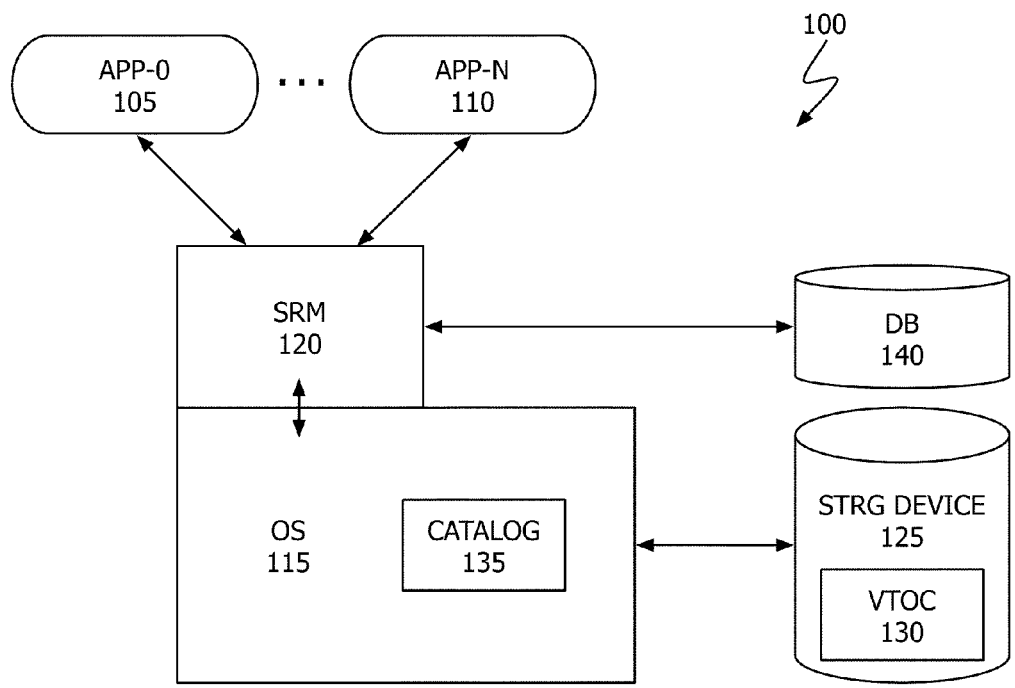
FIG. 1 shows, in block-diagram form, a computing environment suitable for implementing one embodiment of the invention.

Referring to FIG. 1, in one embodiment the invention is designed to operate in computing environment 100 comprising a plurality of user-level applications (e.g., application-0 105 and application-N 110), which request access to storage from operating system 115 through storage resource management (SRM) utility 120. In this type of environment, OS 115 allocates data sets from a storage device 125 (typically a disk storage device). Storage device 125 (also referred to as a volume) records what data sets are stored on it and where they are stored in volume table of contents (VTOC) 130. In like manner, OS 115 records what data sets it has allocated and what volumes they have been allocated from/to in catalog 135. In accordance with one embodiment of the invention, SRM 120 uses database 140 to record instantiation and data set life-cycle event changes. (See discussion below for details.) In one embodiment, OS 115 comprises the multiple virtual storage or MVS operating system from the International Business Machines Corporation, SRM 120 comprises the MAINVIEW Storage Resource Manager Allocation application and DB 140 comprises the data set size assist database; both from BMC Software, Inc.

Figure 2:
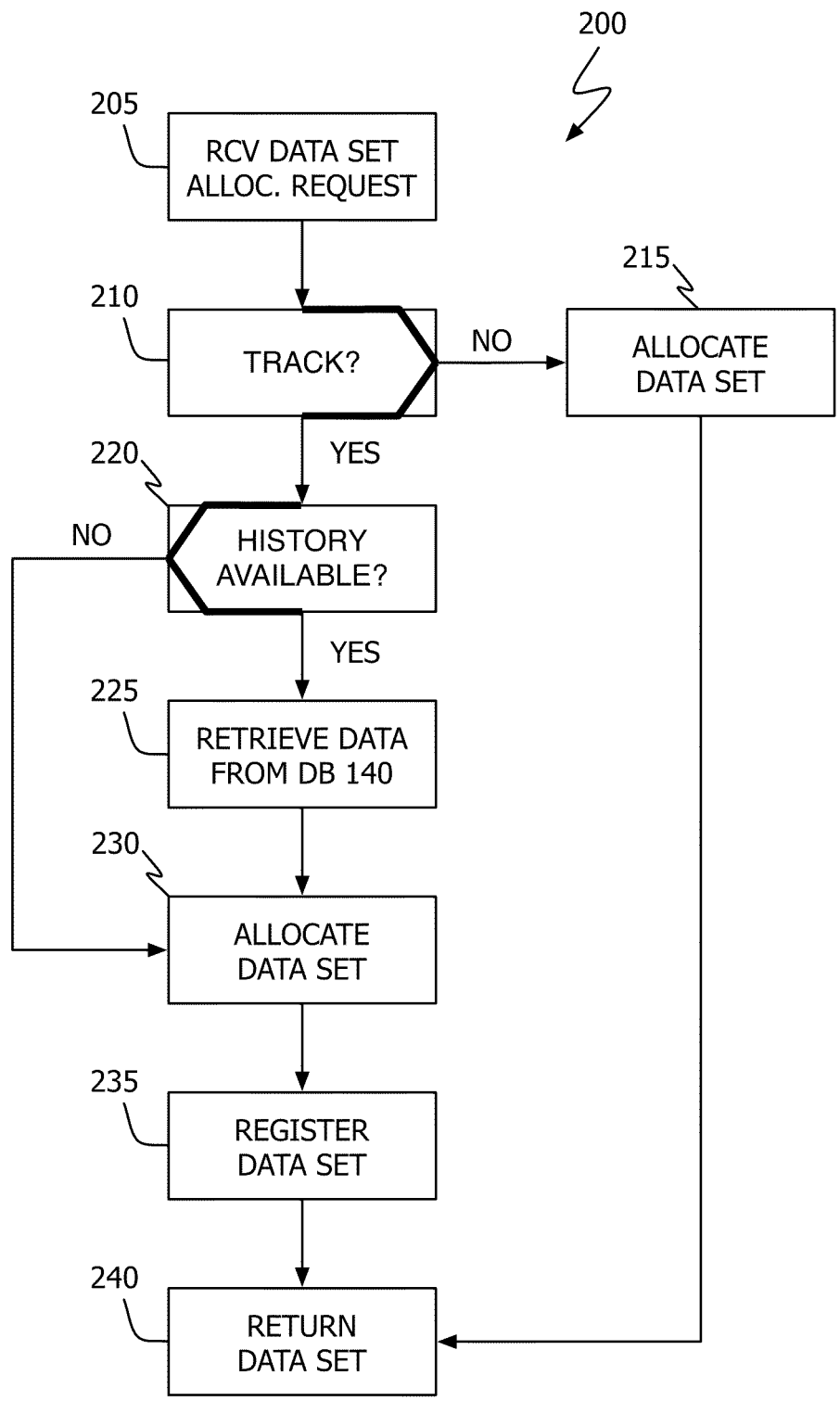
FIG. 2 shows, in flowchart form, a data set allocation process in accordance with one embodiment of the invention.

Referring to FIG. 2, data set allocation process 200 in accordance with one embodiment of the invention begins when an application (e.g., application 105 or 110) requests allocation of a data set (block 205). SRM 120 receives the request and checks to determine if the data set is one that has been designated to be tracked (block 210). If the data set has not been designated for tracking (the "NO" prong of block 210), SRM 120 passes the application's request to OS 115 which allocates storage for the data set in accordance with standard operating procedures (block 215), returning the requested data set to the requesting application (block 240). If the data set has been designated for tracking (the "YES" prong of block 210), SRM 120 checks DB 140 to determine if the requested data set has previously been allocated and tracked (block 220). If the data set has not been previously allocated, or has been allocated but unsuccessfully tracked (the "NO" prong of block 220), SRM 120 passes the application's request to OS 115 which allocates the data set in accordance with standard operating procedures (block 230). If the requested data set has been previously allocated and successfully tracked (the "YES" prong of block 220), SRM 120 retrieves the data set's prior allocation history data from DB 140 (block 225) and uses that information to guide the allocation of the data set in this current instantiation (block 230). More specifically, SRM 120 may use data retrieved from DB 140 in combination with user-specified allocation modification rules to alter the existing allocation parameters for the data set that are passed to OS 115. Illustrative user-specified allocation modification rules include "reduce the next allocation by a specified percentage of the prior allocation." Another illustrative rule would be to "reduce the next allocation by a specified percentage of the prior allocation's free space." Yet another illustrative rule would be to increase a data set's initial allocation if, for example, in a prior life-cycle the data set went into secondary allocation. These rules may be applied to a data set's primary or secondary extent allocation.

Once allocated, SRM 120 registers the data set in DB 140 (block 235), thereafter returning the data set to the requesting application (block 240). As used herein, the term "register" means to create an entry in DB 140 so that life-cycle events for a data set may be recorded. It is advantageous that DB 140 comprise a sharable database so that it may be updated from multiple instances of SRM 120. For example, in an embodiment where OS 115 is MVS, DB 140 may be a virtual storage access method (VSAM) key sequence data set (KSDS) that uses record level sharing. In general, DB 140 may include a record for every data set that is to be tracked in accordance with the invention; each such record being updated every time the record's associated data set undergoes a life-cycle event. (See discussion below.)

Figure 3:
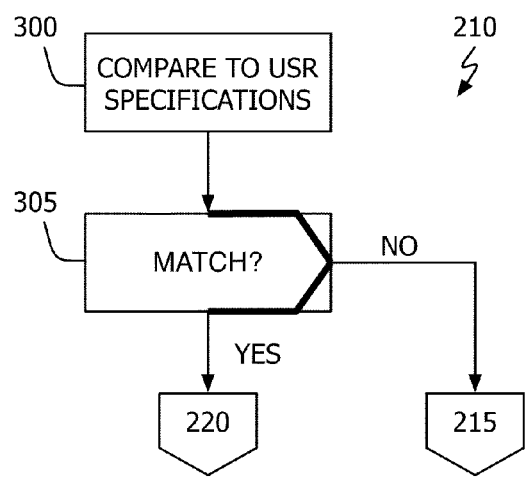
FIG. 3 shows, in block diagram form, data set processing evaluation method in accordance with one embodiment of the invention.

Referring to FIG. 3, determining whether a data set should be tracked in accordance with block 210 may be based on one or more user specified qualifications (block 300). As embodied in the BMC MAINVIEW Allocation product's data set size assist feature, acts in accordance with block 305 are implemented as a series of filter checks to the SPACAQTY function. Illustrative filter checks include, but are not limited to, determining if the data set to be instantiated belongs to a specified class, has a specified name, a specified data set organization (e.g., PS, PO, HFS, IS, . . . ), belongs to a specified management class, belongs to a specified pool, has a specified primary extent, is SMS managed, belongs to a specified storage group or a specified storage class. If any specified combination of these checks are met (the "YES" prong of block 305), the data set is identified for tracking and processing continues at block 220. The combination of checks that must be met to activate tracking may be user specified. That is, a user may specify that if any one check is successfully met, tracking is performed. Alternatively, a user may specify that some combination of checks must be met (e.g., the data set must have a specified primary extent and a specified data set organization and be SMS managed and belong to a specified storage group). If the user specified match fails (the "NO" prong of block 305), the data set is not identified for tracking and processing continues at block 215.

A data set life-cycle may be defined as that time between when a data set is created (or recalled from compressed storage) and when an end-of-life event occurs. End-of-life events include: deletion (e.g., the data set's entry in both VTOC 130 and catalog 135 are removed); migration (the data set is removed from production storage to an off-line storage device such as, for example, a tape device); uncataloging (i.e., the data set's entry in catalog 135 is removed); and, in a MVS embodiment, generation data group (GDG) roll-off.

Figure 4:
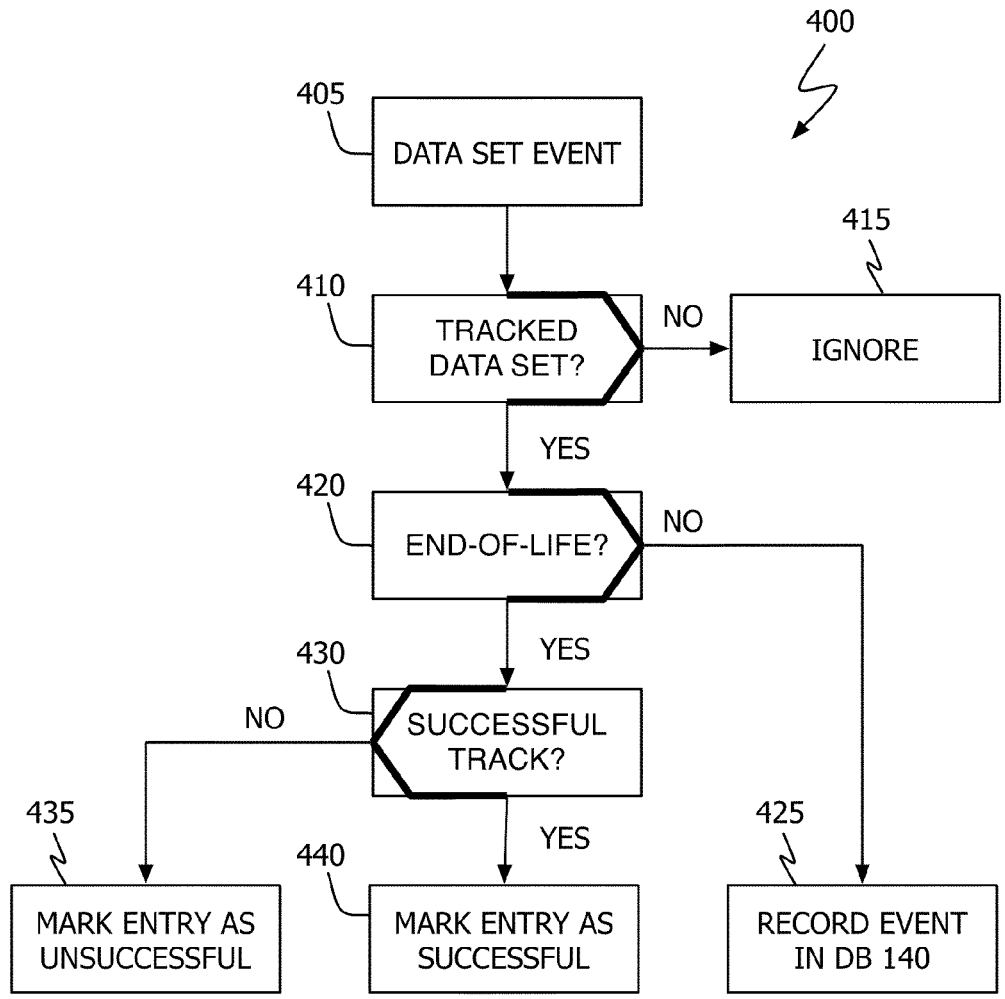
FIG. 4 shows, in block diagram form, a data set event tracking process in accordance with one embodiment of the invention.

Referring to FIG. 4, in between these start (creation) and end (termination) points, data set events may be monitored and tracked in accordance with process 400. As used herein, an "event" refers to an act which alters an existing data set's storage or memory allocation. For example, extending and partially releasing existing data sets are events for purposes of this disclosure. Each time a data set event occurs (block 405), a check is made to determine if the data set to which the action is directed is being tracked. If the data set has not been selected for tracking (the "NO" prong of block 410), the event may be ignored (block 415). If the event is associated with a data set that has been selected for tracking (the "YES" prong of block 410), a further check is made to determine if the current event is an end-of-life event (see discussion above). If the current event is not an end-of-life event (the "NO" prong of block 420), SRM 120 records the amount of storage allocated or released and the amount of free space in the data set at the time of the event in DB 140 (block 425). If the current event is an end-of-life event (the "YES" prong of block 420), a check is made to determine if the data set has been successfully tracked (block 430). A data set has been successfully tracked if the allocation state of the data set at end-of-life (i.e., at the time acts of block 405 occur) corresponds to the state recorded in DB 140 for that data set. If the data set was not successfully tracked (the "NO" prong of block 430), the data set's record in DB 140 for its current instantiation is marked as unsuccessful (block 435). Otherwise, if the data set was successfully tracked (the "YES" prong of block 430), the data set's record in DB 140 for its current instantiation is marked as successful (block 440).

There could be a number of reasons a data set could fail to be successfully tracked from creation to end-of-life. One reason is that SRM 120 could have been terminated (e.g., shutdown) independent from operation of the software application utilizing the allocated data set. If this happens, there is no mechanism to capture and record events in a system such as 100. Another reason that a data set could fail to be successfully tracked from creation to end-of-life is if the data set goes through an event on a computer system that does not have access to SRM 120 or does not execute a software module functionally equivalent to SRM 120 and does not have access to DB 140.

Referring again to FIG. 2, if DB 140 includes historical data for a data set to be currently allocated, that data may be retrieved from DB 140 during the acts of block 225. In one embodiment, only the most recently successful life-cycle data is used to guide the current allocation. In another embodiment, all recorded past successful life-cycle data may be used to guide the current allocation. In yet another embodiment, selected ones of prior recorded successful life-cycle data may be used to guide the current allocation. If data from more than one prior successful life-cycle is used, then it may be combined in any manner desired by the programmer or user (e.g., average, median values, intermediate value between the mean to high allocation values, etc.).

While in some embodiments virtually any type of data set supported by the environment's underlying operating system (e.g., OS 115) may be eligible for allocation modification in accordance with the principles set forth herein, in other embodiments only certain types of data sets may be supported. For example, in one embodiment only VSAM data sets may be tracked. In another embodiment while all VSAM data sets may be tracked and modified, index portions of VSAM data sets may not be modified in accordance with the prior life-cycle behavior. In yet another embodiment, both VSAM and one or more non-VSAM type data sets may be tracked and supported as described herein. In one particular embodiment, targeted for an MVS operating system environment, all VSAM and all non-VSAM data sets except for hierarchical file system (HFS) data sets, z/OS file system (zFS) data sets and partitioned data set extended (PDSE) data set types may be tracked and managed as set forth herein. Referring again to FIG. 1, a common feature of these latter data set types is that if an application such as SRM 120 uses only information from VTOC 130 and catalog 135, it is generally not possible to determine the internal structure (i.e., the free space) of these types of data sets at any given time. Accordingly, if only these sources are relied upon to update DB 140 at data set event time, no substantive information regarding data set memory utilization may be gathered. For these, and similar data set types, additional measures need to be taken to obtain internal data set memory utilization information. By way of example only, Utility 120 (or its functional equivalent) could query OS 115 for this information.

By way of example, consider the case where a user specifies that all VSAM data sets should be reduced by 50% of the data set's end-of-life free space. Referring first to FIG. 2, let SRM 120 receive a request to allocate 100 cylinders for VSAM data set ALPHA (block 205). Since data set ALPHA is a VSAM data set, the data set is to be tracked (the "YES" prong of block 210; see also FIG. 3). Assuming this is the first instantiation of the ALPHA data set, there will be no history for data set ALPHA in DB 140 (the "NO" prong of block 220 will be followed). Accordingly, data set ALPHA will be allocated by OS 115 with 100 cylinders (block 230). Next, SRM 120 registers data set ALPHA in DB 140 (block 235) and then passes ALPHA to the requesting application such as, for example, application 105 (block 240).

Referring to FIG. 4, at some time later the user outputs records to data set ALPHA that occupies 20 cylinders. At some later point in time, data set ALPHA is deleted. This end-of-life event (the "YES" prong of block 420) is noted by SRM 120 in DB 140. In addition, the data set's free space at end-of-life is noted and recorded in DB 140. Finally, data set ALPHA's entry in DB 140 is marked as successful (block 440).

Referring again to FIG. 2, when a user later requests allocation of data set ALPHA again with 100 cylinders, data set historical life-cycle data is available (the "YES" prong of block 220) which is retrieved from DB 140 (block 225). From above, the user-specified allocation rule is that: "all VSAM data sets should be reduced by 50% of the data set's end-of-life free space." Since there were 80 cylinders of free space at data set ALPHA's end-of-life and 50% of this is 40 cylinders, the current allocation of data set ALPHA is reduced by 40 cylinders. Accordingly, SRM 120 alters the allocation parameters for data set ALPHA so that OS 115 allocates only 60 cylinders to ALPHA (block 230). Accordingly, the user (or application) has just saved 40 cylinders of storage that may be used by other users/applications.

Figure 5:
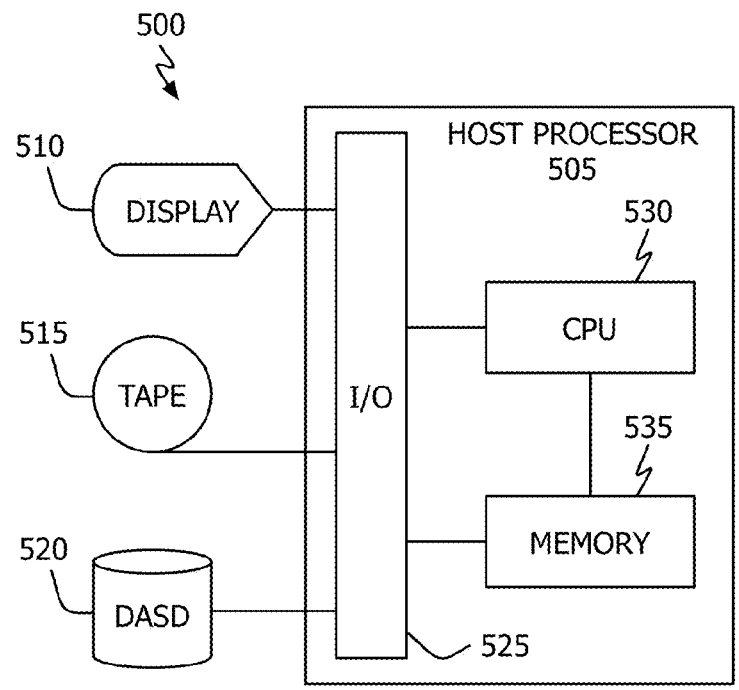
FIG. 5 shows, in block diagram form, a general purpose computer system in accordance with various embodiments of the invention.

Referring to FIG. 5, illustrative general purpose computer system 500 programmed to perform methods in accordance with the invention (e.g., those illustrated in FIGS. 2-4) includes host processor 505, display unit 510 and external storage units 515 (tape) and 520 (direct access storage device, DASD). Host processor 505 comprises input-output (I/O) unit 525, central processing unit 530 and memory 535. Display 510 represents both an output display unit and a keyboard input unit with, optionally, one or more, input devices such as a mouse. External storage unit 520 represents any form of non-volatile storage including, but not limited to, all forms of optical and magnetic storage elements including solid-state storage. Central processing unit 530 may include any programmable controller device including, for example, the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 535 may include one or more memory modules and comprise random access memory (RAM), read only memory (ROM), programmable read only memory (PROM), programmable read-write memory and solid state memory. One of ordinary skill in the art will also recognize that CPU 530 typically includes some internal memory including, for example, cache memory.

Various changes in the materials, components, circuit elements, as well as in the details of the illustrated operational methods are possible without departing from the scope of the following claims. For instance, acts in accordance with FIGS. 2-4 may be performed by a programmable control device executing instructions organized into one or more modules (comprised of computer program code or instructions). A programmable control device may be a single computer processor (e.g., CPU 530), a plurality of computer processors coupled by a communications link or one or more special purpose processors (e.g., a digital signal processor, DSP). Such a programmable control device may be one element in a larger data processing system such as general purpose computer system 500. Storage media as embodied in storage devices such as 515, 520 and 535, as well as memory internal to CPU 530, suitable for tangibly embodying computer program instructions include, but are not limited to: magnetic disks (fixed, floppy, and removable) and tape; optical media such as CD-ROMs and digital video disks (DVDs); and semiconductor memory devices such as Electrically Programmable Read-Only Memory (EPROM), Electrically Erasable Programmable Read-Only Memory (EEPROM), Programmable Gate Arrays and flash devices.

Figure 6:
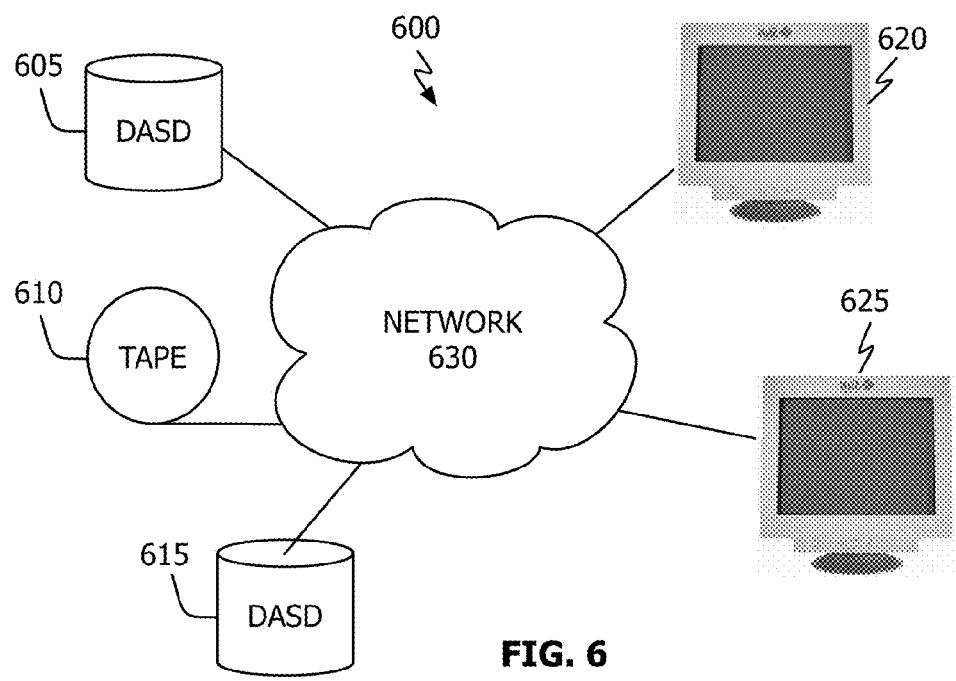
FIG. 6 shows, in block diagram form, a computer network in accordance with various embodiments of the invention.

In addition, computer system 500 could be one of a multiplicity of computer systems coupled through a computer network. As illustrated in FIG. 6, computer network 600 comprises storage units 605, 610 and 615 coupled to host computer systems (e.g., of the type illustrated in FIG. 5) 620 and 625 through network 630—which could be one or more intranets, one or more extranets (e.g., the Internet) or a combination of both intra- and extranets. In network 600, computer system 620, for example, could include memory for retaining program modules for performing any of the methods illustrated in FIGS. 2-4. In addition, DB 140 could be retained locally to the computer system executing the program modules for performing any of the methods illustrated in FIGS. 2-4 or it could be retained distally at, for example, one of the storage devices 605 or 615.

Finally, while methods in accordance with FIGS. 2-4 have been discussed in the context of embodiments targeted for the MVS operating system and VMS style data sets, the invention is not so limited. It will be recognized that while each implementation of an operating system may apply its own unique terms to the concepts discussed here, all commercial operating systems allocate memory in quanta that may be characterized as a data set as that term is defined herein. Accordingly, the preceding descriptions and the following claims are not limited in scope to implementations of the MVS operating system.

The invention claimed is:

1. A data set management method, the method comprising:
receiving, from an executing user-level application, a request to allocate storage space for a new life-cycle of a data set;
determining whether the data set is designated for tracking and has been successfully tracked in a prior life-cycle;
when the data set is not designated for tracking, obtaining allocation of space for the data set based on the request; and
when the data set is designated for tracking and has been successfully tracked:
obtaining storage space event information for the prior life-cycle of the data set, wherein the prior life-cycle represents a prior instance of the data set that existed between a creation event and an end of life event that released all storage space allocated for the prior instance of the data set, the storage space event information including storage space information for the end of life event,
obtaining at least one storage allocation rule applicable to the data set,
altering the storage space size in the allocation request based on application of the at least one allocation rule to the storage space information for the end of life event of the prior life-cycle,
obtaining allocation of space for the data set based on the altered allocation request, the allocation of space representing a current life-cycle of the data set, and
recording storage space event information for the data set reflecting the storage space actually allocated to the data set for the current life-cycle.

2. The method of claim 1, wherein receiving a request to allocate storage space includes determining that the data set satisfies one or more user specified qualifications.

3. The method of claim 2, wherein the one or more user specified qualifications include a specified data class name, a specified data set name, a specified data set organization, belonging to a specified management class, belonging to a specified storage class, requesting a specified amount of secondary storage space, and requesting a specified primary or secondary extent.

4. The method of claim 1, wherein the storage space event information includes an amount of storage space allocated or released during the event.

5. The method of claim 1, obtaining a second storage allocation rule; and applying the wherein obtaining storage space information for a prior life-cycle of the data set includes obtaining information describing at least one event that extended storage space of the data set during the prior life-cycle.

6. The method of claim 1, wherein obtaining storage space information for a prior life-cycle of the data set includes obtaining information describing at least one event that released storage space of the data set during the prior life-cycle.

7. The method of claim 1, wherein obtaining allocation of space for the data set based on the altered allocation request includes obtaining allocation of the space for the data set from an operating system.

8. The method of claim 1, further comprising:
receiving a request to change the space allocated to the data set during the current life-cycle;
obtaining a change in space allocated to the data set based on the received request to change the allocation;
determining that the data set is designated for tracking; and
recording information about the change in space allocated to the data set as a storage space event for the current life-cycle.

9. The method of claim 8, wherein recording information about the change in space allocated to the data set includes recording the amount of free space in the data set at the time substantially immediately after the event.

10. The method of claim 1, further comprising:
receiving an end of life event for the data set;
determining, responsive to receiving the end of life event, whether the data set has been successfully tracked; and
recording whether the data set has been successfully tracked.

11. The method of claim 10, further comprising recording, responsive to determining the data set has been successfully tracked, a storage space event that includes free space in the data set at the end of life.

12. The method of claim 10, wherein receiving the end of life event includes receiving one of the following requests: migrate the data set, terminate the data set, and uncatalog the data set.

13. The method of claim 10, wherein recording whether the data set has been successfully tracked, includes:
determining an amount of allocated space in the data set, referred to as actual space;
obtaining a most recent recorded storage space event for the data set, the most recent recorded storage space event indicating an amount of space for the data set, referred to as recorded space; and
recording that the data set was successfully tracked if the actual space equals the recorded space.

14. The method of claim 1, wherein obtaining at least one storage allocation rule includes obtaining a rule that reduces the request to allocate storage space for the data set by a specified percentage.

15. An article of manufacture comprising a non-transitory program storage medium readable by a computer processor and embodying one or more instructions executable by the computer processor to cause the computer processor to:
receive, from an executing user-level application, a request to allocate storage space for a new current life-cycle of a data set;
determine whether the data set is designated for tracking and has been successfully tracked in a prior life-cycle,
when the data set is not designated for tracking, obtain allocation of space for the data set based on the request; and
when the data set is designated for tracking and has been successfully tracked:
obtain storage space event information for the prior life-cycle of the data set, wherein the prior life-cycle represents a prior instance of the data set that existed between a creation event and an end of life event that released all storage space allocated to the data set, the storage space event information including storage space information for the end of life event, obtain at least one storage allocation rule applicable to the data set, alter the storage space size in the allocation request based on application of the at least one allocation rule to the storage space information for the end of life event of the prior life-cycle, obtain allocation of space for the data set based on the altered allocation request, the allocation of space representing a current life-cycle of the data set, and record storage space event information for the data set reflecting the storage actually allocated to the data set for the current life-cycle.

16. A computer network executing a method to manage a data set, the computer network comprising:

one or more non-volatile storage devices from which data sets may be allocated, the one or more storage devices communicatively coupled to the network;

a database for recording data set life-cycle events, the database communicatively coupled to the network; and one or more computer systems communicatively coupled to the network, at least one of the one or more computer systems having memory, the memory having stored therein program instructions for causing the at least one computer system to:

receive, from an executing user-level application, a request to allocate storage space for a new life-cycle of a data set, determine whether the data set is designated for tracking and has been successfully tracked in a prior life-cycle, when the data set is not designated for tracking, obtain allocation of space for the data set based on the request, and when the data set is designated for tracking and has been successfully tracked:

obtain storage space event information for the prior life-cycle of the data set, wherein the prior life-cycle represents a prior instance of the data set that existed between a creation event and an end of life event that released all storage space allocated to the data set, the storage space event information including storage space information for the end of life event, obtain at least one storage allocation rule applicable to the data set, alter the storage space size in the allocation request based on application of the at least one allocation rule to the storage space information for the end of life event of the prior life-cycle, obtain allocation of space for the data set based on the altered allocation request, the allocation of space representing a current life-cycle of the data set, and record storage space event information for the data set reflecting the storage actually allocated to the data set for the current life-cycle.

17. The computer network of claim 16, the memory further having stored therein program instructions to:

receive an end of life event for the data set;

determine, responsive to receiving the end of life event, whether the data set has been successfully tracked; and record whether the data set has been successfully tracked.

18. The computer network of claim 17, wherein the instructions for recording whether the data set has been successfully tracked, includes instructions to:

determine an amount of allocated space in the data set, referred to as an actual space;

obtain a most recent recorded storage space event for the data set, the prior recorded storage space event indicating an amount of space for the data set, referred to as the recorded space; and record that the data set was successfully tracked if the actual space equals the recorded space.

19. The article of manufacture of claim 15, wherein the instructions for obtaining storage space event information for a prior life-cycle of the data set includes instructions for obtaining information describing at least one event that extended storage space of the data set during the prior life-cycle.

20. The article of manufacture of claim 15, the instructions further causing the computer processor to:

receive an end of life event for the data set;

determine, responsive to receiving the end of life event, whether the data set has been successfully tracked; and record whether the data set has been successfully tracked.

* * * * *